United States Patent [19]
Villaume

[11] 3,918,868
[45] Nov. 11, 1975

[54] APPARATUS FOR PURGING EJECTING PIN CAVITIES

[75] Inventor: Henry F. Villaume, Intervale, N.H.

[73] Assignee: Howell Laboratories, Incorporated, Bridgton, Maine

[22] Filed: June 20, 1974

[21] Appl. No.: 481,036

[52] U.S. Cl. .............. 425/169; 425/135; 425/242; 264/37
[51] Int. Cl.² .......................................... B29F 1/00
[58] Field of Search ........... 425/135, 169, 242, 444; 264/37

[56] References Cited
UNITED STATES PATENTS
3,599,578 8/1971 Sato ................................ 425/73 X
3,789,093 1/1974 Bose ................................. 264/37

*Primary Examiner*—Francis S. Hosar
*Assistant Examiner*—David S. Safran
*Attorney, Agent, or Firm*—Richard L. Stevens

[57] ABSTRACT

The ejecting pin cavity of an ejection molding machine is sealed from the atmosphere. Dehydrated air at a positive pressure is introduced into the sealed cavity. The dehydrated air eliminates moisture from the cavity.

3 Claims, 2 Drawing Figures

3,918,868

APPARATUS FOR PURGING EJECTING PIN CAVITIES

BACKGROUND OF THE INVENTION

In injection molding machines, commonly there is a hot plastic side and a ram side. The facing platens of the hot plastic side and the ram side typically contain dies or molds which when engaged define a mold cavity. When these platens are in the closed position, a hot plastic charge is passed through a gate into the mold cavity. The casting is formed, and the ram side of the macine withdrawn. Ejecting pins in the ram side reciprocate independently of the movement of the ram side, such that when the ram side is in its withdrawn position, the ejecting pins move their ends protruding into the mold cavity whereby the casting is ejected. After the casting has been injected, the ejecting pins are withdrawn, their ends flush with the surface of the cavity and the cycle repeated.

In most injection molding machines, the ejecting pins are disposed in an ejecting pin actuation cavity, which cavity is exposed to the surrounding environment. The ejecting pins are lubricated to facilitate their reciprocating action. It has been found that moisture accumulates on the surfaces of the ejecting pins. This moisture travels along the ejection pins and eventually is deposited on the cavity walls. Also, The moisture accumulated on the surface of the ejecting pins tends to aid in the migration of the lubricant on the ejecting pins into the mold cavity. The accumulation on the walls of the mold cavity of oil and moisture results in the mixing of the charge with the oil and water, such that an inferior casting is produced, typically having an oil spot or a pitted or marred surface. To overcome this problem, the air about the ejection pins must be controlled to eliminate the moisture accumulation on the pins. One way of achieving this would be to maintain the temperature and humidity of the environment about an injection molding machine, such that moisture would not condense on the pins. However, this is not satisfactory for two reasons: firstly, the cost of controlling the temperature and humidity to the degree required would add considerably to the cost of the final cast product; and secondly, the humidity would have to be maintained at such a low dew point the entire working area would not be comfortable for personnel because of the extreme dryness.

SUMMARY OF THE INVENTION

This invention relates to a method and apparatus for controlling the moisture content of a fluid stream flowing through an enclosure. More particularly, the invention is directed to an apparatus and method for removing moisture from an air stream through a cavity of an injection molding machine.

In a preferred embodiment, the ejecting pin actuation cavity of an injection molding machine is sealed from the surrounding environment. A dried air stream flows through the cavity in moisture transfer relationship with at least some of the surfaces of the ejecting pins in the cavity. The dried air has a dew point well below the temperature of any of the ejecting pins or other surfaces within the cavity. Consequently, no condensed moisture can accumulate. The pressure within the defined enclosure is maintained positive relative to the surrounding atmosphere, such that moisture-laden air from the surrounding environment will not be allowed to seep into the defined enclosure.

In the preferred embodiment of the invention, the ejecting pin actuation cavity of an injection molding machine is enclosed and sealed from the environment. Dehydrated air passes through the enclosure at a controlled rate and at a positive pressure to insure that no condensation will form on the surfaces of the ejection pins, thus eliminating the possibility of inferior castings caused by the mixture of the moisture with the charge introduced into the mold cavity and increasing the production rate by permitting lower cooling temperatures.

The apparatus of my invention includes means to enclose the actuation pin cavity of an injection molding machine to seal the cavity from the surrounding environment; means to provide air of a predetermined composition; means to introduce the air into the sealed cavity at a rate and pressure such that the formation of moisture on the pin surfaces is eliminated; and means to discharge the air from the enclosure. The method of my invention includes defining an enclosure about a pin actuation cavity of an injection molding machine; dehydrating an air stream; introducing the air stream into the sealed cavity to prevent the accumulation of moisture on the walls of the ejecting pins and other surfaces; maintaining the pressure within the cavity positive relative to the pressure of the surrounding atmosphere; and discharging the air from the sealed cavity.

DESCRIPTION OF THE PREFERRED EMBODIMENT(S)

Figure 1:
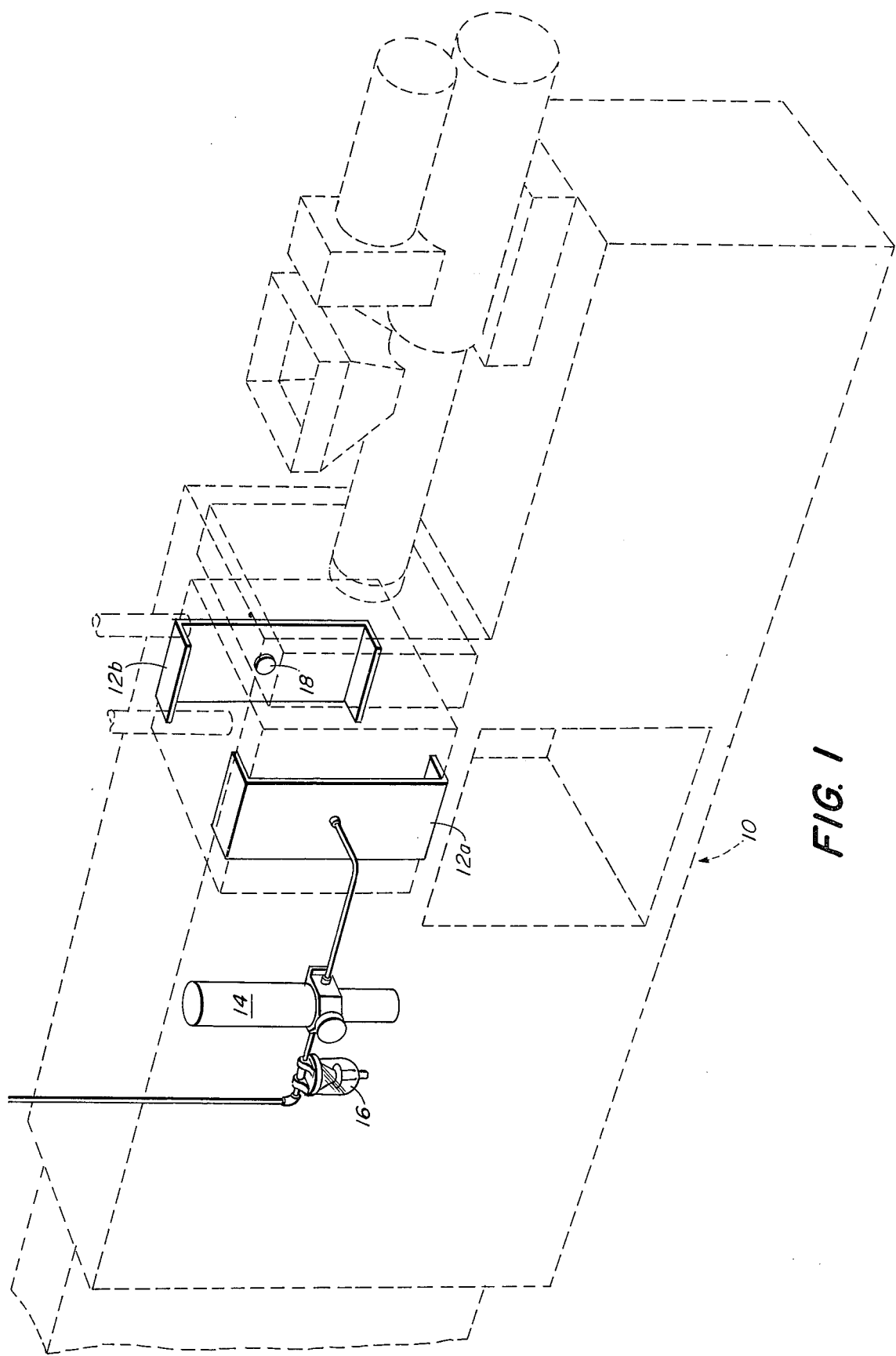
FIG. 1 is an illustration of one embodiment of the invention employed with a prior art injection molding machine.

In FIG. 1 a plastic injection molding machine is shown generally at 10, which machine is part of the prior art, for example, a New Britain plastic injection molding machine pre-mixed molder having a 250 ton clamp 50 cubic inch capacity. Secured to the machine 10 are plenums 12a and b. A dehydrator 14, such as a Howell Laboratories, Inc. single towered dehydrator, Model No. 2566, communicates with the plenum 12a. Upstream of the dehydrator 14 is a condensed moisture and oil separator with dump valve 16. The air inlet to the knock-out valve may be connected to either a compressor-after cooler-surge tank combination or to customer air lines, if available. A dryness indicator 18 is secured to the plenum 12b.

Figure 2:
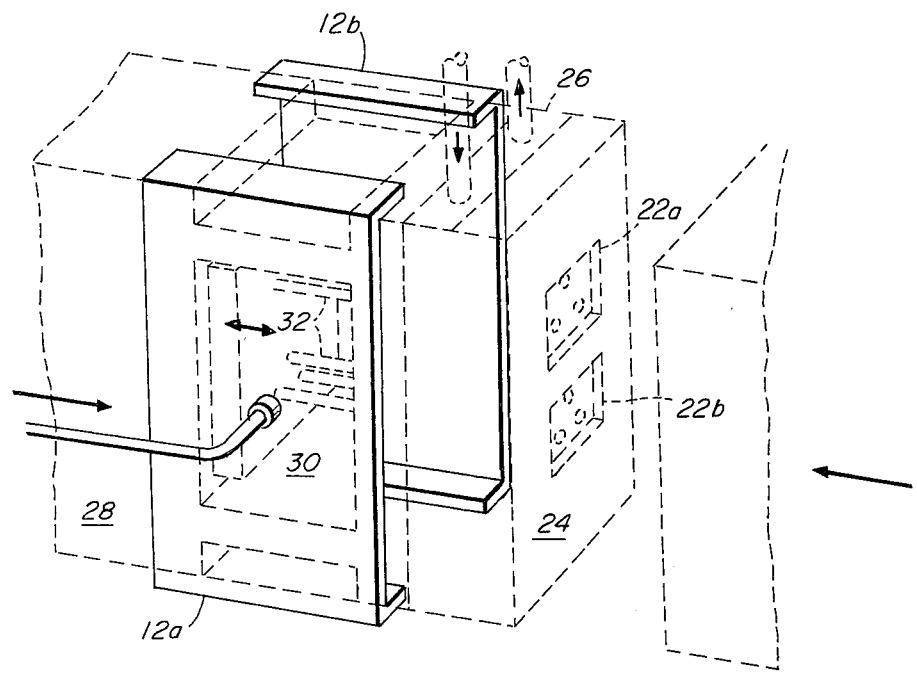
FIG. 2 is a partially sectional illustration of the invention of FIG. 1.

Referring to FIG. 2, the invention is shown in greater detail. As will be understood by those skilled in the art, the drawings represent an illustrative embodiment of an injection molding machine, wherein certain parts and configurations have been modified for the purposes of clarity and explaining the present invention. As is well known, the injection molding machine comprises a hot plastic side and a ram side. The platens of the two sides include the dies or molds which define the cavities within which the charge is introduced.

Mold cavities 22a and b are disposed in a platen 24. The platen is secured to a cooling module 26, which cooling module 26 abuts a housing 28 within which is an ejecting pin actuation cavity 30. Ejecting pins 32 disposed in the cavity are adapted to reciprocate independently of the movement of the ram side of the molding machine 10. These pins 32 are normally exposed to the atmosphere.

In the present invention, the plenums 12a and b are secured to the housing in a seal-tight manner. The plenums are configured as shown having upper and lower lips to engage the upper and lower surfaces of the housing. The plenums are secured by press fit and sealed with adhesive back sponge sealing tape. The downstream plenum is allowed to leak a slight amount to assure flow through the cavity 30. Dehydrated air at a flow rate of 0.10 cubic feet per minute, temperature of 70°F. and dew point of −40°F, is introduced into the ejecting pin actuation cavity by the dehydrator 14. The flow rate into the cavity is such that a pressure of about 0.3 psi gauge is maintained to insure that leakage from the cavity will be outwardly and prevent the introduction of moisture-laden air into the cavity onto the surfaces of the ejecting pins.

The flow of the dehydrated air into the sealed cavity 30 insures that no moisture will accumulate on the surfaces of the ejecting pins 32. This prevents the transfer of moisture and lubricant into the mold cavities and eliminates inferior castings which might normally be produced. Normally the higher the flow of coolant through the cooling module 26 results in additional moisture on the ejecting pins. In a standard operation the cooling rate is carefully controlled to minimize the amount of condensate which is produced. Thus dehydrating the cavity also permits more cooling fluid to be introduced to 26, and thus increase production rates by up to 15%.

The invention has been described in reference to a standard injection molding machine having a particular configuration for the plenums. However, it should be understood that any configuration of plenums or other structures may be used to provide a sealed enclosure for those parts of an injection molding machine which are exposed to the atmosphere and which would allow the condensation on their surfaces which would eventually result in marred or inferior castings. The inventive concept may also be used with the back flow hoppers filled with pellets of deliquescent plastics, particularly nylons. As is known, when nylon pellets are exposed to moisture, they readily absorb it. On being molded, the moisture is heated sufficiently to be vaporized and cause defects in the castings. By employing the same concept, that is, defining an enclosure about a specific area, purging the area with the flow of a dried air stream, this particular problem may also be overcome.

Having described my invention, what I now claim is:

1. In an injection molding machine wherein the ejecting pins are disposed in an ejecting pin actuation cavity which is defined by portions of the machine and is exposed to the atmosphere, the improvement which comprises:

means to seal an ejecting pin actuation cavity from the atmosphere;
means to provide a dried air stream; and
means to introduce the dried air stream into the ejecting pin actuation cavidy at a positive pressure to prevent the condensation of moisture on the surfaces of the ejecting pins.

2. The apparatus of claim 1, wherein the means to seal the cavity from the atmosphere includes a plurality of plenums secured to the machine portions which define the cavity.

3. The apparatus of claim 1, which includes means mounted within the cavity to measure the dew point of the air in the sealed cavity.

* * * * *